United States Patent [19]
Sahlgren et al.

[11] Patent Number: 5,946,094
[45] Date of Patent: Aug. 31, 1999

[54] APPARATUS FOR DETERMINING THE CURVATURE OF AN ELONGATED HOLE

[75] Inventors: Bengt Sahlgren, Saltsjö-Boo; Raoul Stubbe, Stocksund; Claes Ericsson, Vallentuna, all of Sweden

[73] Assignee: Reflex Instrument AB, Vallentuna, Sweden

[21] Appl. No.: 08/894,126

[22] PCT Filed: Feb. 9, 1996

[86] PCT No.: PCT/SE96/00084

§ 371 Date: Aug. 13, 1997

§ 102(e) Date: Aug. 13, 1997

[87] PCT Pub. No.: WO96/25584

PCT Pub. Date: Aug. 22, 1996

[30] Foreign Application Priority Data

Feb. 13, 1995 [SE] Sweden ................................. 9500512

[51] Int. Cl.⁶ .................................................. G01B 9/02
[52] U.S. Cl. .......................................... 356/345; 356/352
[58] Field of Search ...................... 385/12–13; 356/345, 356/349, 358, 361, 352, 35.5; 250/227.14, 227.16

[56] References Cited

U.S. PATENT DOCUMENTS

| | | | |
|---|---|---|---|
| 4,436,419 | 3/1984 | Stetson et al. | 356/35.5 |
| 4,525,818 | 7/1985 | Cielo et al. | 385/13 |
| 4,806,012 | 2/1989 | Meltz et al. | 356/32 |
| 4,927,232 | 5/1990 | Griffiths | 385/13 |
| 5,301,001 | 4/1994 | Murphy et al. | 356/345 |
| 5,528,367 | 6/1996 | Putnam et al. | 356/345 |

FOREIGN PATENT DOCUMENTS

| | | |
|---|---|---|
| 0 251 671 | 1/1988 | European Pat. Off. . |
| 373 635 | 2/1975 | Sweden . |
| 387 698 | 9/1976 | Sweden . |

*Primary Examiner*—Robert Kim
*Assistant Examiner*—Amanda Merlino
*Attorney, Agent, or Firm*—Jacobson, Price, Holman & Stern, PLLC

[57] ABSTRACT

Apparatus for determining the curvature of an elongated channel, such as a drill hole in rock for instance, wherein the apparatus includes a probe (1) which may be constructed for movement through the channel and to assume the curvature of the channel at the different positions into which the probe is moved along the channel, wherein the probe (1) includes means (3, 31, 10) for sensing the curvature of the probe, and thus also the curvature of the channel, between at least two longitudinally spaced positions (A, B) on the probe (1), and wherein the apparatus can be connected to means (10) for determining the extension of the channel by registering curvature of the probe, for instance in different positions of the probe along the channel. The probe means include an optical fibre section (31) which is connected to a flexible probe body (3) arranged in the probe (1), wherein the optical fibre section (31) extends parallel with and at a constant distance from the bending neutral axis (44) of the probe body (3), such that strain acting in the fibre section will constitute a measurement of the bending or curvature of the probe body (3) in an axial plane (41) that includes the fibre section (31). The optical fibre section (31) has two partial reflection means(8a, 8b; 22a, 22b), for instance gratings, at said positions (A, B) along the probe. Means (10) are connected to the optical fibre section for interferometric determination of the change in distance between the partial reflection means in the fibre section (31). Means (32, 10) are provided for compensating for the influence of temperature on the change in distance between the partial reflection means.

14 Claims, 3 Drawing Sheets

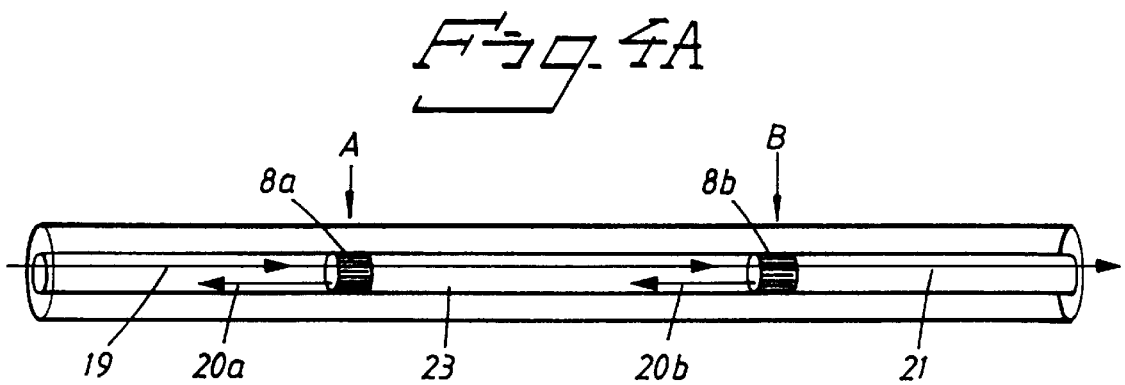
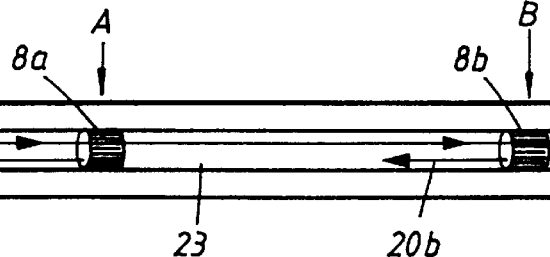
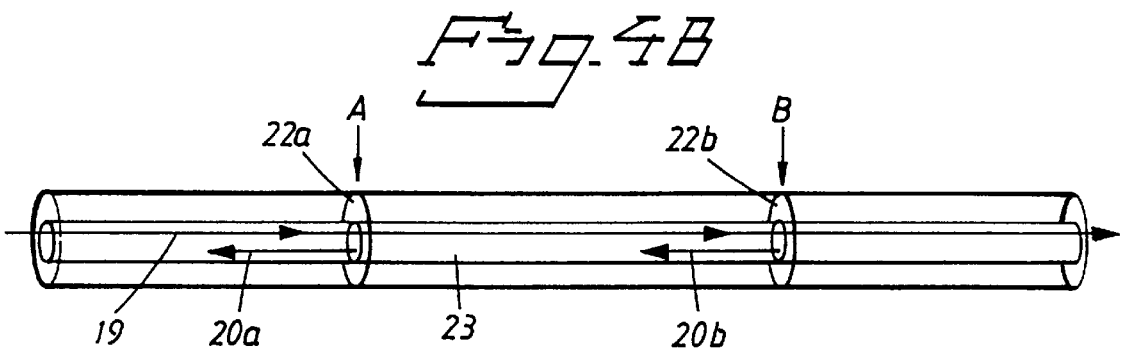
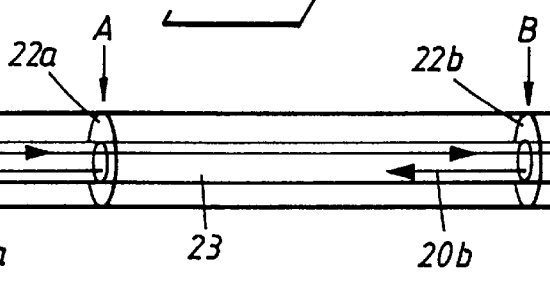
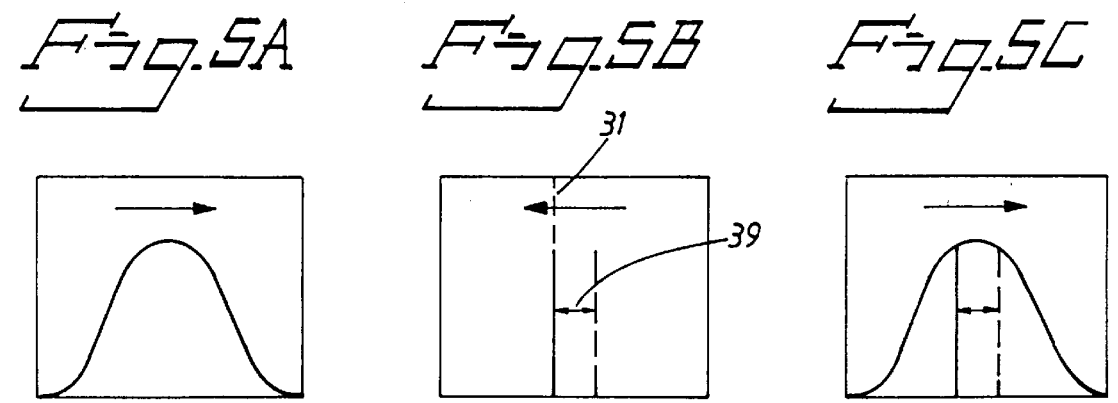
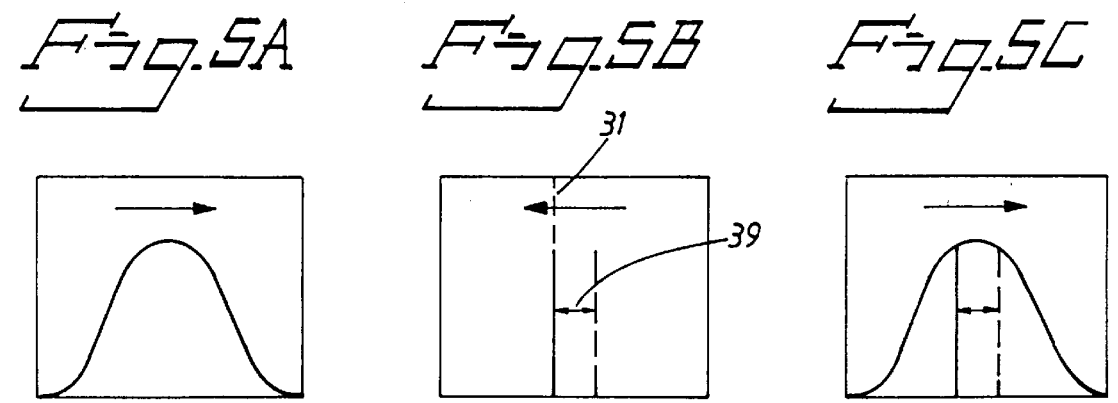
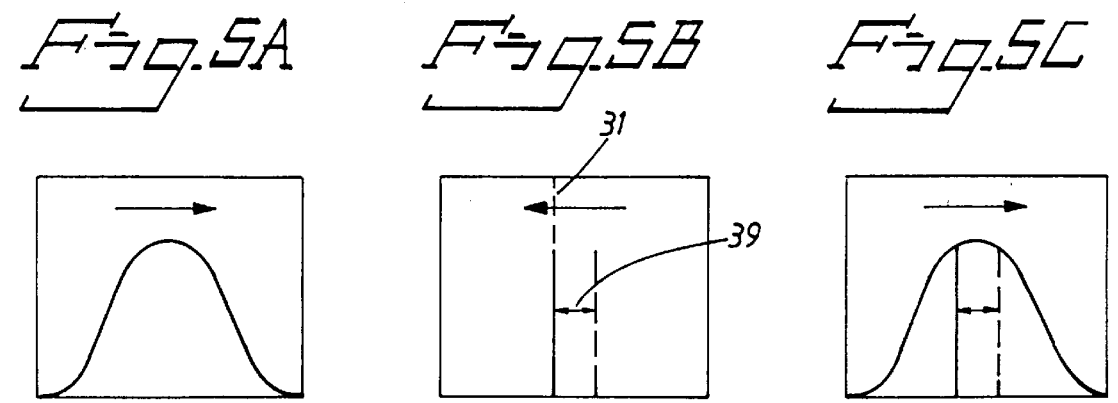
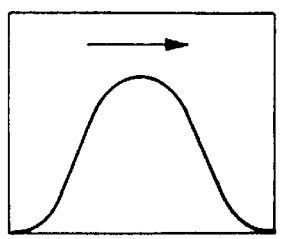
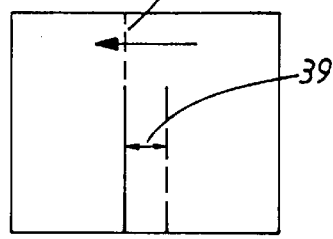
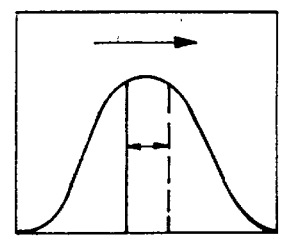

APPARATUS FOR DETERMINING THE CURVATURE OF AN ELONGATED HOLE

BACKGROUND OF THE INVENTION

1. Field of the Invention

The invention relates to apparatus for determining the curvature of an elongated hole, such as a drill hole, in rock;

2. Description of the Related Art

Apparatus of this kind find use in ore prospecting operations and in investigating and mapping ore deposits and other types of deposits. It is, of course, important when investigating ore deposits for instance, to be aware of the actual directional extension of the test holes that are drilled to this end, for instance the location of the hole at different depths, in order to effectively map the deposits. Such drill holes will always have curved sections and it is therefore necessary to determine the actual longitudinal extension of the drill hole. In this regard, there has earlier been used an apparatus of the kind taught by SE-C-387698 (7304122-0), wherein an apparatus probe is moved to different longitudinal sections of the hole and is constructed to conform to the curvature of the hole. Curvature or bending of the probe is determined with the aid of a camera which observes an objective in the probe, wherein the relative transversal displacement of the objective caused by curving of the probe constitutes a measurement of the curvature of the drill hole.

SUMMARY OF THE INVENTION

In order to provide an accurate measuring result and, at the same time, to minimize the total cost of the preliminary exploration, the known probe must have a relatively large diameter. Naturally, the diameter of the test drill hole must be correspondingly large, and it is well known that the cost of drilling the test hole increases with increasing hole diameters.

It is therefore generally favourable from the aspect of cost to use narrow drill holes to this end, without detracting from the accuracy to which the curvature of the hole is determined along its length.

It is therefore an object of the present invention to provide an apparatus probe of the aforesaid kind which combines high measuring accuracy with a small but effective diameter.

A further object of the invention is to provide an apparatus which is very flexible, magnetically insensitive, production friendly and temperature independent and which enables measurements to be made at several points along the probe in a simple manner.

These objects are achieved with the present invention.

As will be understood, the invention is not restricted solely to determining the longitudinal extension of drill holes in rock, but can be used more generally to determine the curvature of any form of channel or passageway. In an extreme case, such a channel or passageway may conceivably have the form of a slot, wherein the actual probe may be rigid in the width direction of the slot when it is essentially only necessary to obtain information regarding curvature of the slot solely in a plane at right angles to the width direction of the slot.

According to the invention, an optic fibre section is fitted in or on the probe body at a distance from its bending neutral line, preferably close to the outer surface of the probe body. The optical fibre section is mounted in the length direction of the probe. Consequently, as the probe bends, the optical fibre section will be subjected to a change in length that is representative of the extent to which the probe bends in an axial plane embraced by the optical fibre section and the probe axis. By probe axis is meant its bending neutral line, i.e. the centres of gravity of respective probe cross-section areas. According to the invention, the channel curvature is evaluated by calculating the physical change in distance between two partial reflection devices (e.g. gratings) in an optical fibre, but the curvature is measured optically such that the measuring result will comprise primarily the optical change in distance between the partial reflection devices. It is important to note that this optical change in distance does not solely correspond to the physical change in distance but is also influenced by the fact that the optical properties of the fibre, such as refractive index, are also affected by the physical bending of the fibre. Because the optical fibre sections have separate partial reflection devices, changes in length of the optical fibre section between the reflection devices as a result of bending of the section in the axial plane through the probe in which the section lies can be measured interferometrically. In the case of the present invention, curvature of the channel results in changes in the core of the optical fibre used, which in turn results in an "electromagnetic signature" that can be measured. This results in a much more pronounced coupling between the measured magnitude, i.e. the curvature, and the light carried in the fibre, and therewith conditions for the provision of a high accuracy sensor and also enabling the probe to be given a relatively small diameter and therewith afford the aforesaid advantages. The use of two fibre sections in different axial planes thus enables bending of the probe and the position of the bend around the probe axis to be calculated. The two axial planes may conveniently be separated through an angle of 90°, for instance. The probe body is also influenced by shear stresses in the presence of large stretching forces. In view of this, it may be appropriate to provide the probe with three optical fibre sections (having associated pairs of reflection devices) in different axial planes, for instance and preferably in equidistantly separated axial planes.

U.S. Pat. No. 4,927,232 discloses a non-related technique of monitoring a buried pipeline with regard to ground movements with the aid of an optical fibre on the surface of the pipeline along the length thereof. The core of the optical fibre is surrounded by cladding which when subjected to radial forces changes the "electrooptic signature" of the optical fibre, such that an indication of a change in the radial forces acting on the pipeline can be obtained by measuring such changes in the "electrooptic signature" of the optical fibre.

U.S. Pat. No. 4,806,012 describes an optical fibre strain gauge. The optical fibre is attached to or embedded in a structure, for instance a plate, which is to be monitored with regard to strain distribution along the fibre. The core string of the optical fibre is provided with different grating formations along its length. When the fibre in one such grating section is subjected to strain and when the fibre is subjected to a change in temperature, the spacing between the grating lines in the grating will change so as to cause a change in the reflection wavelength of the grating and thereby enable the strain acting in the various grating formations to be measured optically. An optical fibre strain gauge of this kind has relatively low sensitivity.

It is also known to measure strain with a so-called Fizeau interferometer, which in principle comprises an optical fibre having longitudinally spaced partial reflection devices, for instance gratings, so as to enable strain acting in the fibre to be determined interferometrically, by detecting the changes in length of the fibre between two gratings.

The probe of the inventive apparatus may be made thin, which is highly significant in reducing the cost of tests drilling, for instance in mapping a deposit, such as an ore deposit. An important advantage of using an optical fibre in accordance with the invention is that the actual sensor part of the apparatus may be included as a permanent installation that has a sufficiently long length of life, at reasonable cost. For instance, it is of interest to be able to monitor regularly movements and displacements in rock formations and earth strata over relatively long time periods, for instance in the construction of large dams and roads, by moving the probe to mutually sequential longitudinal sections of drill holes therein and measuring the curvature of the drill holes. The relatively much more expensive signal processing part of the equipment can then be connected temporarily to the sensor, when the actual measuring process is to take place.

Another advantage afforded by the aforedescribed use of a sensor part which includes an optical fibre having reflection means in the apparatus probe is that a long row of sensor elements (each comprising an optical fibre section having two separate gratings, for instance) can be multiplexed on one single fibre. This enables the construction of a probe/ sensor which is able to measure curvature at a large number of locations along a long distance. Because a large number of sensors are multiplexed on a long sensor/probe and because the different sensor elements use different gratings, measurements can be effected much more quickly than was earlier possible. A measuring process effected in accordance with the known technique is much more laborious. Multiplexing can be utilized for measuring, for instance, the path difference or the time difference between incoming light and light reflected from gratings, when said gratings are identical but located at different positions along the optical fibre. Alternatively, multiplexing can be based on different reflection wavelenghts for grating of mutually different frequencies.

Another advantage afforded by the use of optical fibre sections having mutually spaced reflection means, such as mirrors in an interferometer, is that it enables a measuring distance to be defined along which the mean value of the curvature is obtained. This avoids the problem of local inhomogeneities.

A further advantage of fibre gratings is that they can be mass-produced. This enables gratings to be produced in the fibre (enables gratings to be written into the fibre) at a large number of locations along an optical fibre, which may have a length measured in kilometers, at relatively low extra cost. The gratings may be formed by exposing the fibre interferometrically with UV light. In the production of a sensor within the scope of the present invention, the sensor part can thereby be produced at very low cost.

In one embodiment of the inventive apparatus, the probe may be much shorter than the channel whose curvature/ longitudinal extension is to be determined, wherein the probe is moved to different positions along the length of the channel, wherein the curvature of the channel is registered at said different positions, and wherein the rotational position of the probe in said different positions is also conveniently registered. It will be evident from the aforegoing that the probe of a fundamental embodiment is able to function with partial reflection means, e.g. gratings, located in axially separated positions. It will also be evident from the aforegoing that the probe may be provided with gratings/ reflection means in a plurality or multiple of axially separated positions along the strain sensing optical fibres, so as to enable curvature to be measured in many different axial positions along the probe and along the channel with the same distance requirement between the curvature measuring points and without needing to move the actual probe axially.

As indicated in the aforegoing, the probe may be configured with a multiple of partial reflection means, for instance several thousand reflection means or pairs thereof at separate locations along the optical fibre/optical fibres of the probe, so as to enable the probe to be manufactured in lengths of up to several thousand metres. This affords the favourable possibility of placing the probe in the rock formation or soil formation itself along a length or distance of particular interest and the probe left permanently therein or for a long period of time. This enables the curvature of the probe to be quickly determined and, by frequently determining curvature of the probe, enable important changes in curvature that occur in the soil formation/rock formation in which the probe is placed to be observed and determined. Such monitoring systems find use, for instance, in tunnel excavating work and like work, wherein one or more test holes are drilled along but outside said tunnel extension, and wherein long inventive probes can be inserted into these test holes and left therein so as to be able to establish the occurrence of changes by frequently determining curvature of the probe, and the magnitude of or the danger presented by these changes in connection with and due to continued excavation/ blasting of the tunnel, so as to enable necessary countermeasures to be taken before the risks of or the disadvantages of the change in curvature/settling of the ground reaches a dangerous state.

BRIEF DESCRIPTION OF THE DRAWINGS

The invention will be described in more detail in the following with reference to exemplifying embodiments thereof and also with reference to the accompanying drawing, in which

FIGS. 4A and 4B illustrate two examples of sensor elements comprised of optical fibres in which mutually spaced reflection means are disposed; and FIGS. 5A–C illustrate the light intensity as a function of the wavelength of incoming, reflected and transmitted light at a grating-type reflection means.

In one simple embodiment, the probe 1 comprises protective tubing 4, for instance brass tubing or tubing comprised of a fiber-glass composite, which although being rigid is sufficiently flexible to enable the tubing to conform to the same curvature as that of a drill hole into which the probe is inserted. The probe has essentially the same diameter as the drill hole, so that the probe will closely follow the curvature of said hole. The probe includes a probe body 3 which in the present case is comprised of a flexible, circular-cylindrical rod in the form of a thick-walled pipe whose inner and outer diameters are known. The probe body 3 is held concentrically in the protective tubing 4 by means of tubular spacer elements 5. The spacer elements 5 may have the form of slide bearings which enable the probe body 3 to rotate relative to the protective tubing 4. Optical fibres 31–34 are attached to the cylindrical probe body 3, for instance embedded therein or glued thereto. The fibres are fastened on/in the body 3 in a manner such that the fibres will bend when the body is subjected to strain. The fibres 31–34 extend parallel with the bending neutral line of the body, wherein each of the fibres is spaced at a constant distance along its length from the axis of the body 3 (the bending neutral line of the body) along its measuring distance.

Figure 1:
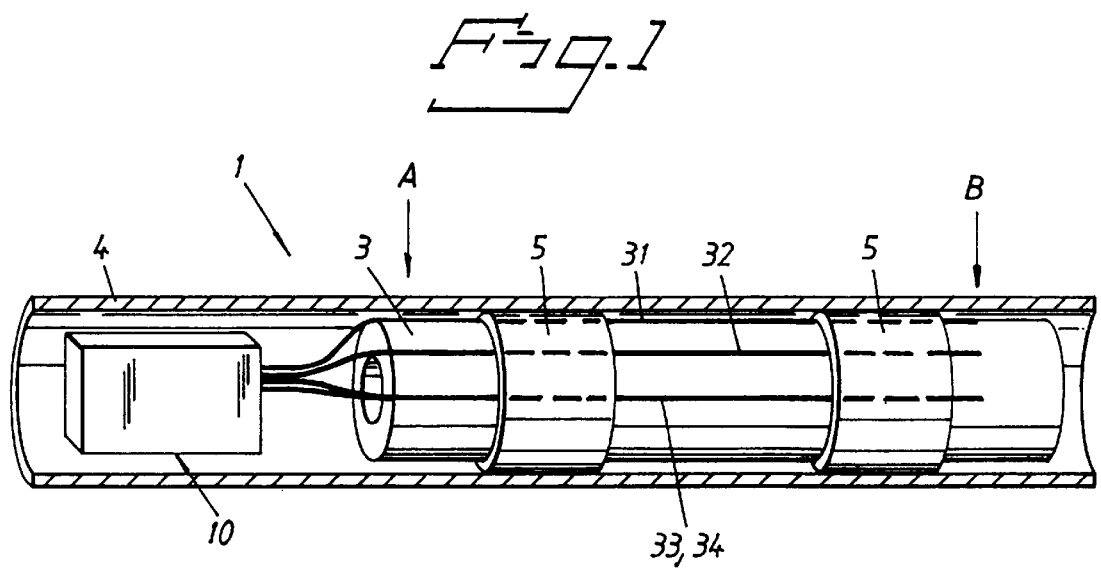
FIG. 1 is a schematic longitudinal sectional view of an inventive probe.
Figure 3A:
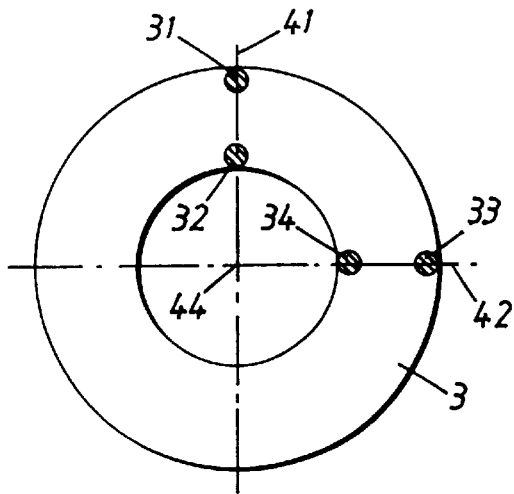
FIGS. 3A–D illustrate four different configurations of a tubular probe body with surface-mounted optical fibres and housed in protective tubing.

FIG. 3A can be considered as being a cross-sectional view of the tubular probe body 3 of FIG. 1, and it can be seen from FIG. 3A that the fibres 31 and 32 lie respectively on the inner surface and the outer surface of the body 3 in an axial plane 41 of the body 3 that extends through its neutral bending axis 44. Correspondingly, the fibres 33 and 34 lie in an axial plane 42 of the body 3, these planes 41, 42 being mutually separated, preferably through an angle of 90°. In the case of the configuration illustrated in FIG. 3A, the fibres lie in respective axial planes on the same side of the axis 44.

Referring back to FIG. 1, it will be seen that the fibres 31–34 are connected to a signal processing unit.

Each of the optical fibres includes a partial reflection means 8a, 8b, 22a, 22b disposed at two predetermined positions A and B respectively along the body 3.

As shown in FIG. 4A, said partial reflection means may comprise respective fibre gratings 8a and 8b. Incoming light 19 is reflected partially by the grating 8a and gives rise to an oppositely directed beam of light 20a, and the other grating 8b gives rise to an oppositely directed beam of light 20b in a similar manner, wherein part of the light is transmitted as indicated at 21.

In an alternative embodiment (FIG. 4B), partially reflecting mirrors 22a and 22b can be incorporated in the fibres at respective positions A and B, for instance by severing the optical fibre and then applying a layer of, e.g., TiO$_2$ by vapour deposition on the cut surfaces, and thereafter welding the fibre ends together so that the vapour-deposited layer will establish a partially reflecting mirror.

Figure 2:
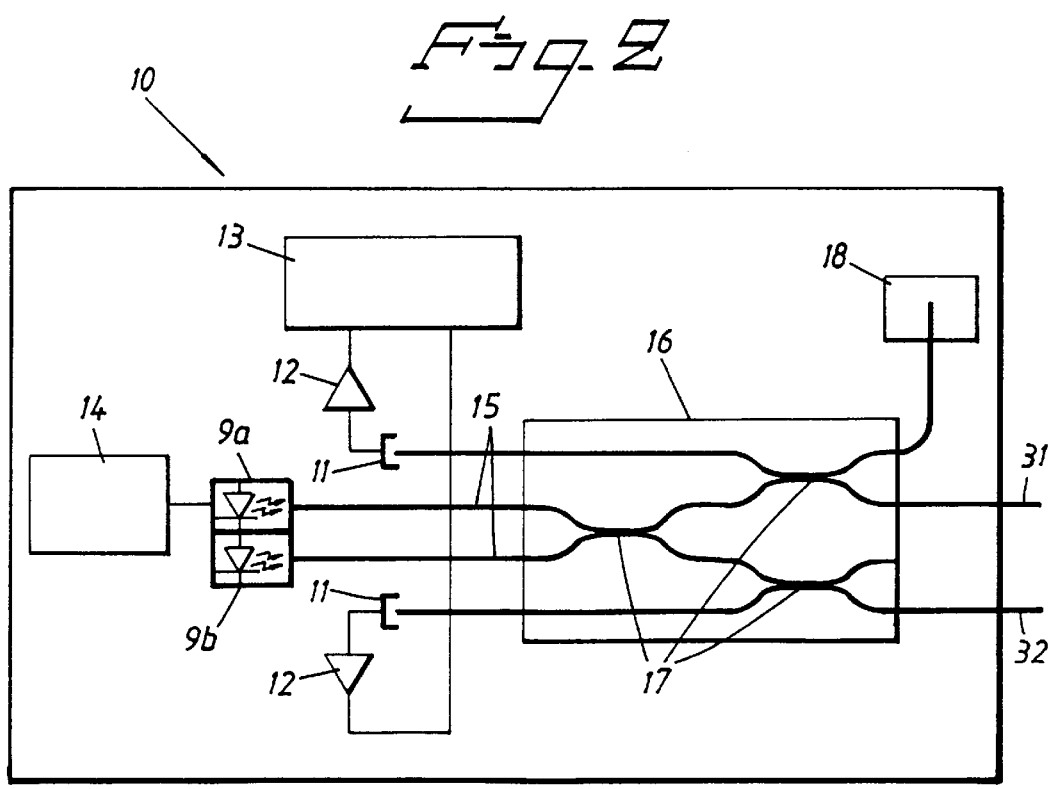
FIG. 2 is a schematic illustration of the control unit included in the probe.

As will be seen from FIG. 2, light from the light sources 9a, 9b is conducted through optical fibres 15 to an optical chip 16, where the light is distributed to the sensor fibres 31, 32 through the medium of a plurality of waveguide switches or couplers 17. After having been reflected in the grating elements 8a, 8b, the light 19 returns as signals 20a, 20b which are re-distributed to the detectors 11 by the chip 16 and thereafter amplified in respective amplifier stages 12, as shown in FIG. 4A. The resultant signal is finally processed electronically in the processor 13. The light sources 9a, 9b are driven with the aid of control electronics 14, which ensure that the wavelength of the laser light source is held constant, with the aid of a reference grating 18.

The fibre gratings 8a, 8b have a broad spectral characteristic in relation to the light source 9. The pair of gratings 8a, 8b will function as a pair of mirrors in the fibre when the wavelength of the light source 9 is chosen close to the central wavelength of the gratings 8a, 8b. When the reflectance of the gratings is relatively low, so as to enable multiple reflections to be ignored, the two reflection means, the gratings 8a, and the fibre form a so-called Fizeau interferometer. The phase position between the two reflected light beams 20a, 20b is linearly dependent on the distance between the gratings 8a, 8b and thereby linearly dependent on strain acting on the optical fibre. The phase difference thus reflects the bending of the probe body 3 between the pair of gratings. The two reflected light beams 20a, 20b are thus led back to the detector 10, where they are allowed to interfere. In this regard, the length of coherence of the light source will preferably be greater than twice the distance between the gratings 8a, 8b. The processor 13 functions to produce a bending measurement value. The detected signal is sinusoidally dependent on the phase difference (interference fringes) and the processing of the signals is mainly to count the interference Fringes and to check the location of the interference fringes. An important advantage afforded by the interferometric measuring technique is that it is sufficiently sensitive or responsive to enable very small bends, or in other words large radii of curvature, to be measured.

One drawback, however, is the periodic dependency of the signal on bending. As a result, the measuring method does not give an absolute value, but only relative measuring values. This weakness can be overcome in several ways, however. One way is to use two wavelength interferometry. As the name implies, two wavelengths are then required, these wavelengths either being obtained by using two mutually independent light sources 9a, 9b (c.f. FIG. 2) or by using a light source which can be tuned with respect to wavelength, so as to achieve a corresponding function.

By measuring the fringe position at both wavelengths, it is possible to determine on which fringe the interferometer is located in the fringe order in a quasi-absolute manner over a sufficiently wide measuring range. This method can also be applied in ascertaining the direction in which the fringes move. Another method is to use one of the gratings 8a, 8b included in the Fizeau interferometer, and particularly the spectral characteristics of the grating. By using a tunable light source, or by using spectroscopic detection, i.e. wavelength-dependent detection, it is possible, for instance, to establish the central wavelength of the grating. The central wavelength is thus the strain-dependent wavelength, and an absolute value of fibre bending can be established by measuring this central wavelength. However, this method is not as accurate as the interferometric method, but can be used to provide an approximate starting value. The method, however, may be used advantageously in combination with two wavelength interferometry to obtain extremely accurate measurements of the absolute value of the strain in the fibre.

The use of two parallel, mutually separated optical fibre sections 31, 32 in an axial plane 41 with reflection means at equal portions along the probe, afford the advantage that any change in temperature will affect the two fibres 31, 32 to the same extent, whereas bending of the probe body 3 will induce different strains in respective fibres 31, 32. A temperature-independent strain measuring signal can thus be obtained from the interferometers constructed from the fibres 31, 32 subsequent to corresponding signal processing.

Figure 3B:
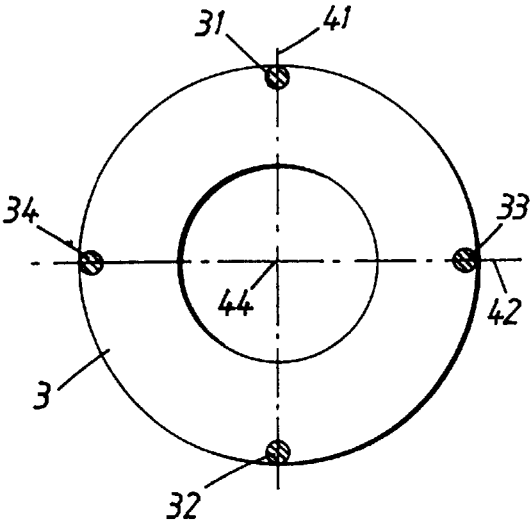

The configuration according to FIG. 3B can be considered to show that the fibre sections 32 and 34 have been moved parallel to one another in their respective axial planes 41, 42, to the region of the outer surface of the probe body 3. All of the active fibre sections 31–34 will hereby be located at the greatest possible distance from the axis 44, thereby enabling the diameter of the probe body to be minimized.

Figure 3C:
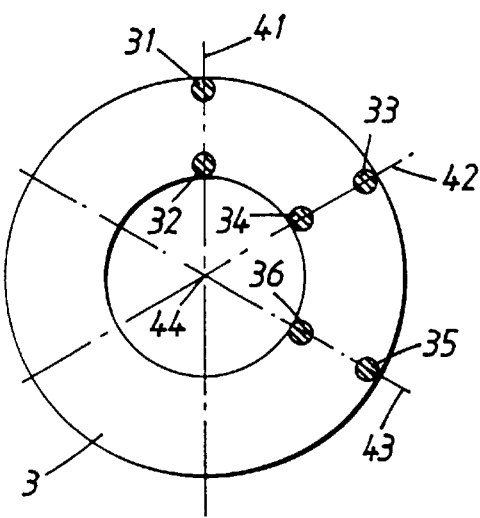
Figure 3D:
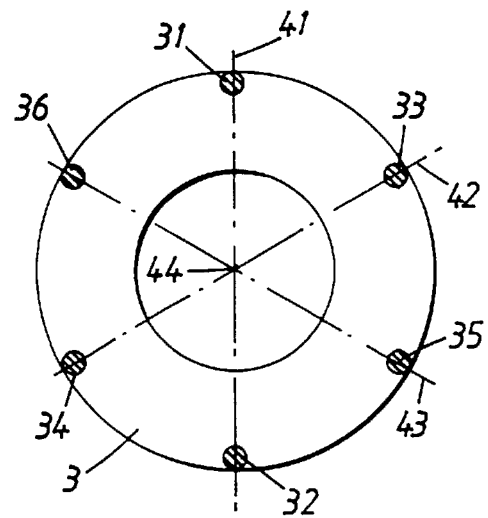

In the case of the FIG. 3C configuration, a further pair of fibre sections 35, 36 are disposed in an axial plane 43 comprising the axis 44, wherein the fibres 35, 36 lie parallel with and along the generatrices of the body 3. In the case of the FIG. 3C embodiment, the three pairs of fibre sections 31, 32; 33, 34; 35, 36 are disposed in equidistantly spaced planes. The additional information obtained by the sensors 35, 36 in the "third" axial plane can be used for compensating any errors that may occur as a result of shear stresses generated when the sensor body is subjected to heavy bending, i.e. is given a relatively small radius of curvature.

Exemplifying embodiments have been described in which strain sensing optical fibre sections lie in at least two angularly separated axial planes that extend through the bending mutual line of the probe, so as to enable bending/curvature of the probe to be measured in three dimensions.

An additional fibre section/Fizeau interferometer has been included to provide temperature compensation of the measuring signal.

It will be understood, however, that the probe body 3 need not necessarily be rotational symmetrical. It may be so that it is known beforehand that the curvature of the channel to be measured will be much greater in one certain plane than in another plane and that the probe body may be constructed accordingly, for instance so that the body can be given an elliptic cross-section. By giving the probe body 3 a well-defined shape and by also giving the fibre sections 31, 34 a well-defined position, bending can be calculated with the aid of known models for bending beam-like objects. However, this does not exclude the possibility of obtaining the ratio between resultant signals and curvature with the aid of a calibration process instead. In certain instances, this may even be a necessary complement to the model calculations.

FIGS. 5A–C illustrate light intensity as a function of wavelength for incoming, reflected and transmitted light in a grating. The vacating 8 is a periodic refractive index variation which has been written into the fibre core 23 by means of interfering UV light. When light emanating from a broadband light source, i.e. light having a broad spectrum (FIG. 5A), falls on the grating 8, only the wavelength 31 which is twice as long as the periodicity of the grating will be reflected back (FIG. 5B). When the grating 8 is subjected to strain, the reflective wavelength will increase and the change in wavelength 39 of reflected light will constitute a measurement of the strain. The phase shift between the reflected light beams or rays thus indicates strain, i.e. bending of the probe body 3. From a measuring technical aspect, such a phase difference can only be established by coherent detection. FIG. 5C illustrates light transmitted through the grating 8.

Modifications are possible within the scope of the invention

Although the illustrated embodiment illustrates a measuring process based on reflected light, it will be obvious that the measuring process can equally as well be carried out on the basis of transmitted light. Furthermore, the interferometers may, of course, be connected in series if the reflection means are constructed in accordance with known techniques such that said means and their measurement signals can be identified.

The orientation of the sensor body (3) is not fully determined by establishing its curvature, since the probe body may rotate about its axis as it is moved through the measuring channel (the rock drill hole). Consequently, the apparatus probe will preferably be supplemented with either a gyroscope 51 or a spirit level which will provide information relating to the rotational position of the probe.

Subsequent to being processed in the detector 10, information relating to curvature and possibly to the rotational position of the probe can be registered in the probe or transmitted conventionally over wires or fibres or by radio to a remotely operated receiver, for instance at an accessible end of the channel.

We claim:

1. An apparatus for determining the curvature of an elongated channel, said apparatus comprising a flexible probe which is intended to assume the curvature of the channel when inserted thereinto, said probe having sensing means for sensing the curvature of the probe and therewith the curvature of the channel, between at least two longitudinally spaced probe positions on the probe, said sensing means further including a first optical fibre section connected to a bendable probe body disposed in the probe and connected to said probe to accompany bending or curving of said probe, said first optical fibre section extending parallel with and at a constant distance from a bending neutral axis of the probe body so that the strain of the first optical fibre section will provide a measurement of the bending of the probe body in an axial plane that includes the first optical fibre section, said first optical fibre section including two partial reflection means at said longitudinally spaced probe positions along the probe body, a determination means connected to the first optical fibre section for interferometric determination of a change in distance between the partial reflection means in the first optical fibre section; and a compensating means for compensating for the influence of temperature on the change in distance between the partial reflection means.

2. The apparatus according to claim 1, the compensating means including a second optical fibre section extending parallel to the first optical fibre section in a same axial plane as the first optical fibre section, said second fibre section has two partial reflection means also in said positions along the probe body, the difference in strain between the first and second optical fibre sections provides a temperature-independent measurement value of the extent to which the probe bends in the axial plane.

3. The apparatus according to claim 2, the distance between the probe positions is at least ten times the radius of the probe body to the second optical fibre section; and in that the cross-sectional dimension of the probe in a bending plane is less than 5 cm and greater than 0.1 cm.

4. The apparatus according to claim 1, the reflection means comprising fibre gratings having a line width of at least 0.2 nm.

5. The apparatus according to claim 1, the axis of the probe body is defined by the centres of gravities of the cross-sectional area of the probe body; and the respective fibre sections between said reflection means have a well-defined, constant distance from the probe axis to a median line of the fibre section.

6. The apparatus according to claim 1, further comprising two light sources of different wavelengths for determining the phase difference for light reflected from the two partial reflection means over a larger dynamic area than pi.

7. The apparatus according to claim 1, wherein the reflection means of the optical fibre section are constructed to determine the optical wavelength that is reflected by a grating and to compare this wavelength with a calibrating wavelength that the grating has in a non-curved state of the probe, for establishing an approximately absolute value of a interferometrically generated measuring signal from the reflection means in the first optical fibre section.

8. The apparatus according to claim 1, the probe including an optical fibre which remains free of load when the probe bends or curves; and that this load-free fibre includes a grating of calibrated periodicity which functions as a reference for evaluating an absolute bending value of a probe whose first optical fibre section has reflection means in the form of gratings.

9. The apparatus according to claim 1, including a second optical fibre section, the first and second optical fibre sections each having a pair of partial reflection means and lie in mutually spaced axial planes so that bending of the probe body can be determined three-dimensionally.

10. The apparatus according to claim 9, including second and third optical fibre sections which lie in mutually spaced axial planes with said first optical fibre section for measuring bending of the probe body in said respective axial planes, said planes being preferably spaced apart through equal angles.

11. The apparatus according to claim 1, the first optical fibre section comprising more than two longitudinally separated partial reflection means, wherein changes in distance between the partial reflection means in different longitudinal sections of the optical fibre section are sensed with the aid of a multiplexing technique.

12. The apparatus according to claim 1, the probe including sensing means for sensing the orientation of the probe body about its axis.

13. The apparatus according to claim 1, the probe having a length which is smaller than the length of the channel whose curvature is to be determined along its length; and in that the probe can be moved to different positions along the channel for determining curvature of said channel at respective positions of the probe; and in that the apparatus can be connected to means for registering channel curvature in said probe positions.

14. The apparatus according to claim 1, the probe having a measuring length which is at least equally as long as the channel; and in that the channel has a plurality of partial reflection means spaced along the length of the probe so as to enable curvature or bending of the probe to be measured at a plurality of mutually spaced locations along the probe placed in the channel, whereby measuring of a curvature/extension of the channel along essentially the whole of its length can be effected without moving the probe in the channel.

* * * * *